United States Patent [19]

Marui et al.

[11] Patent Number: 5,508,758
[45] Date of Patent: Apr. 16, 1996

[54] SELF-LOCKING NUT WITH THREADED AND SELF-LOCKING MEMBERS, USEFUL FOR EYE GLASSES, AND A NUT TIGHTENER AND A NUT SUPPLIER FOR SAME

[75] Inventors: Koreto Marui; Ryuichi Ohtsuki; Masahiro Ohara, all of Kyoto, Japan

[73] Assignee: Nitto Seiko Co., Ltd., Kyoto, Japan

[21] Appl. No.: 230,926

[22] Filed: Apr. 21, 1994

[30] Foreign Application Priority Data

| Apr. 21, 1993 | [JP] | Japan | 5-131499 |
| Jun. 1, 1993 | [JP] | Japan | 5-169497 |
| Jul. 28, 1993 | [JP] | Japan | 5-227743 |
| Aug. 4, 1993 | [JP] | Japan | 5-229730 |
| Aug. 4, 1993 | [JP] | Japan | 5-229731 |
| Aug. 27, 1993 | [JP] | Japan | 5-248428 |
| Oct. 29, 1993 | [JP] | Japan | 5-305718 |

[51] Int. Cl.$^6$ .................. G02C 5/00; F16B 39/34; F16B 37/04; F16B 43/00
[52] U.S. Cl. .................. 351/141; 351/146; 411/302; 411/108; 411/335; 411/999
[58] Field of Search .................. 351/140, 141, 351/145, 146, 178; 411/432, 903, 301, 302, 309, 324, 335, 103, 108, 182, 377, 429, 437, 442, 947, 965, 966, 999

[56] References Cited

U.S. PATENT DOCUMENTS

| 2,071,045 | 2/1937 | Searles | 351/140 |
| 2,175,355 | 10/1939 | Lowres | 351/140 |
| 3,030,997 | 4/1962 | Collins | 411/301 |
| 4,887,950 | 12/1989 | Sakayori et al. | 411/302 |

FOREIGN PATENT DOCUMENTS

| 0597645 | 5/1960 | Canada | 411/437 |
| 8501040 | 1/1985 | Germany |  |
| 4-30415 | 11/1989 | Japan |  |
| 1-38574 | 11/1989 | Japan |  |
| 830722 | 3/1960 | United Kingdom |  |

Primary Examiner—William L. Sikes
Assistant Examiner—Huy Mai
Attorney, Agent, or Firm—Merchant, Gould, Smith, Edell, Welter & Schmidt

[57] ABSTRACT

A self-locking nut for eye glasses excellent in assembling efficiency into which a male screw is fitted to secure a material between the head of the male screw and the self-locking nut itself, comprising a first member having a female thread portion formed with a female thread in which the male screw is screwed and a pressing end face for pressing the material when the male screw is screwed in, a second member which is continuously formed on the other end face of the first member away form the material and which has a self-locking hole concentric with and connected to the threaded hole, and a third member continuously formed on the end face of the first member closer to the material and having a bushing portion which can be inserted into a hole in the material and which is formed with a through hole connected to the threaded hole of the first member; a moisture-proof nut comprising a sealing element having one end closed to bring the other end into contact with the material to waterproof the main body of the nut and a cushioning element which is provided inside the sealing element to cushion shock between the sealing element and the material; a ring-shaped nut tightener which is easily carried and attached with a screw bit; and a nut supplier for efficiently setting nuts to intended positions, comprising radially branched arms for holding self-locking nuts on the tips thereof.

14 Claims, 14 Drawing Sheets

SELF-LOCKING NUT WITH THREADED AND SELF-LOCKING MEMBERS, USEFUL FOR EYE GLASSES, AND A NUT TIGHTENER AND A NUT SUPPLIER FOR SAME

BACKGROUND OF THE INVENTION

1. Field of the Invention

The present invention relates to a self-locking nut for fastening an eye-glass lens to a frame or the like, to a nut tightener for tightening or loosening a small nut used in eye glasses, and to a nut supplier which enables efficient assembling and repairing of eye glasses using small-sized plastic nuts.

2. Description of the Prior Art

In general, lenses of rimless-type eye glasses are fastened to metal members or the like through the following procedure shown in FIG. 1: first, a pair of T-washers 31 are fitted into a hole 22 formed in a lens 21 from both ends; and then the lens 21 is attached to a metal member 24 by means of a small screw 25 and a nut 32. However, since the simple tightening of the normal metal nut cannot substantially provide a self-locking effect, the loosening of the nut will occur during a long period of use. To prevent this, it is possible to use a double nut and slightly rotate its inner element in the reverse direction at the final stage of tightening so as to prevent the fastening device from loosening, due to the combined effect of both elements of the double nut. In the case of using the double nut, however, a male screw with a long shank should be used. Moreover, since the double nut consists of two elements, the fastening device becomes heavier accordingly, resulting in the overall imbalance and impaired appearance of eye glasses. Hence, the use of a double nut is not preferred for eye glasses in which light weight and good appearance are valuable factors.

Furthermore, since it is necessary in rimless-type eye glasses to fit the T-washers 31 into the hole 22 in the lens from both ends in order to prevent the breakage of the lens at the time of fastening the screw as described above, a larger number of parts are used to assemble eye glasses, which results in reduced assembling efficiency and increased production cost. In view of the foregoing, there has conventionally been a demand for a nut for eye glasses which realizes improved assembling efficiency without increasing production cost.

In addition, since a small nut for eye glasses is hard to handle with fingers, it is difficult for a worker to properly guide the nut to an intended position in a material to be fastened prior to the fastening operation. Consequently, the fastening operation requires much attention and labor from the worker, and there is a possibility that the worker drops the nut onto the lens surface by mistake, thereby damaging the lens. Hence, a small nut which can easily be handled and set to an intended position in eye glasses has been awaited.

The conventional metal nut is also disadvantageous in that its appearance may be impaired by the generation of corrosion and that the nut may be unfastened due to the development of corrosion during a long period of use, which may cause the falling of the lens or other trouble. To prevent such trouble, a method of covering the fastened nut with a plastic cap, separately produced, has been adopted for moisture prevention. However, the method of attaching the water-proof plastic cap requires an additional step of attaching the moisture-proof cap as well as a larger number of parts to assemble eye glasses. Consequently, the efficiency with which eye glasses are assembled is reduced, while production cost is further increased. Hence, there has conventionally been a demand for a water-proof nut for eye glasses which is low in cost and improves assembling efficiency.

However, since the nut used in eye glasses is extremely small as described above, there is a case where the worker tightening the nut mishandles a spanner away from the intended position onto the lens surface or where the worker drops the spanner onto the eye glasses by mistake. Conventionally, a metal spanner has been used for tightening the eye-glass nut to be attached. However, the metal spanner is comparatively expensive, and if mishandled, it may cause a serious damage to the main body or lens of the eye glasses. Since it is difficult to handle and rotate the small nut used in eye glasses with fingers and it requires considerable attention and labor from the worker engaged in the tightening operation, the conventional spanner for eye glasses is not perfect as a tool for tightening such a small nut securely and easily. Moreover, the screw fastened to eye glasses may loosen anywhere at any time. If the screw is left loosened, the lens may fall out of the eye-glass frame or other trouble may occur, so that the screw should be retightened every time it loosens. However, since the conventional metal spanner is heavy in weight and may cause a damage to the lens if mishandled, it is not suitable for use as a nut tightener to be constantly carried and used, if necessary, by a common eye-glass user. Consequently, a nut tightener for eye glasses which enables easy and secure tightening of the small nut has conventionally been awaited.

SUMMARY OF THE INVENTION

The present invention has been achieved in view of the foregoing circumstances.

A first object of the present invention is to provide a nut for eye glasses having a self-locking function.

A second object of the present invention is to provide a low-price nut for eye glasses which has a self-locking function and which does not cause a damage to the lens even when it is dropped onto the lens.

A third object of the present invention is to provide a nut for eye glasses which is excellent in assembling efficiency and which does not cause a crack in a material to be secured (such as a lens), while satisfying the requirements defined in the above second object.

A fourth object of the present invention is to provide a nut for eye glasses which is excellent in moisture prevention, while satisfying the requirements defined in the above second and third objects.

A fifth object of the present invention is to provide a nut for eye glasses which exhibits excellent properties during the tightening operation and which can be guided to an intended position precisely and easily in spite of its smallness, while satisfying the requirements defined in the above second and fourth objects.

A sixth object of the present invention is to provide a low-price nut tightener for eye glasses which enables secure, easy fastening of a small nut or screw to an intended portion of eye glasses and which is easily carried and handled.

A seventh object of the present invention is to provide a nut supplier which enables secure, easy setting of each small nut to an intended position in a material to be secured and which is easily handled.

The above first object can be attained at least by a self-locking nut for eye glasses comprising: a first member having a female thread portion formed with a female thread and a pressing end face for pressing the material to be secured when the male screw is fastened into the female thread portion; and a second member which is continuously formed on the other end face of the first member away from the material to be secured and which has a self-locking hole concentric with and connected to the threaded hole. In the self-locking nut for eye glasses, the self-locking hole of the second member is an unthreaded hole having a diameter equal to or smaller than the pitch diameter of the female thread of the first member. This is why, according to the self-locking nut for eye-glasses of the present invention, the first member having a female thread is mated with a male screw so as to exert a strong fastening force, while the second member formed with a self-locking hole prevents the male screw from loosening.

The above second object can be attained at least by a self-locking nut for eye glasses wherein: the second member is composed of a plastic material softer than the material of the first member and is formed integrally with the first member so as to cover up the side face of the first member; the first member is a metal nut; the side face of the metal nut is formed with a groove for enhancing the fixation of the metal nut to the second member; and the internal surface of the unthreaded hole is formed with a plurality of vertical grooves which extend vertically along the axis of the hole and which expand radially from the internal surface of the hole toward the outer surface of the second member.

The above second object can also be attained by a self-locking plastic nut for eye glasses which is composed of a resin and into which a male screw is fitted so as to secure a material between the head of the male screw and the self-locking plastic nut itself, the self-locking plastic nut comprising: a nut portion formed to have a polygonal cross section; and a nut extension formed continuously from the nut portion so as to have a diameter equal to or smaller than the outside diameter of the nut portion, the nut portion and nut extension constituting a main body of the nut in which an unthreaded hole having a diameter equal to or smaller than the pitch diameter of the male screw is formed at the center in the direction in which the male screw is driven. In the self-locking plastic nut for eye glasses, the unthreaded hole has a plurality of vertical grooves which are formed in its internal surface and which extend along the axis of the hole. This is why, according to the self-locking nut for eye glasses of the present invention, the main body of the nut is covered with a plastic material softer than the material of the first member, so that the nut seldom causes damage to the lens even if it is dropped onto the lens. Moreover, since the self-locking hole is formed in the plastic material serving as an elastic body so that its diameter is equal to or smaller than the pitch diameter of the male screw, the male screw which has been screwed in the self-locking hole has its threaded grooves filled with the plastic material. Consequently, frictional resistance acts against the loosening force, so that the male screw is constantly under the pressing force from its surroundings, thereby seldom generating loosening.

The above third object can be attained by a self-locking nut for eye glasses into which a male screw is fitted so as to secure a material between the head of the male screw and the self-locking nut itself, comprising: a first member having a female thread portion formed with a female thread in which the male screw is screwed and a pressing end face for pressing the material to be fastened when the male screw is screwed in; a second member which is continuously formed on the other end face of the first member away from the material to be fastened and which has a self-locking hole concentric with and connected to the threaded hole; and a third member continuously formed on the end face of the first member closer to the material to be secured and having a bushing portion which can be inserted into a hole in the material to be secured and which is formed with a through hole connected to the threaded hole of the first member. In the self-locking nut for eye glasses, the self-locking hole of the second member is an unthreaded hole having a diameter equal to or slightly smaller than the pitch diameter of the female thread of the first member; the second and third members are composed of a plastic material softer than the material of the first member and are formed integrally with the first member so as to cover up the side face of the first member; the first member is a metal nut; the side face of the metal nut is formed with a groove for enhancing the fixation of the metal nut to the second member; the internal surface of the unthreaded hole is formed with a plurality of vertical grooves which extend vertically along the axis of the hole and which expand radially from the internal surface of the hole toward the outer surface of the second member; and the second member further has a rod-like arm portion which protrudes from the outer surface of a main body made of a plastic material so that its joint with the main body is formed thinner than the other portion thereof.

The above third object can also be attained by a self-locking plastic nut for eye glasses which is composed of a resin and into which a male screw is fitted so as to secure a material between the head of the male screw and the self-locking plastic nut itself, the self-locking plastic nut comprising: a nut portion formed to have a polygonal cross section; and a nut extension formed continuously from the nut portion so as to have a diameter equal to or smaller than the outside diameter of the nut portion, the nut portion and nut extension constituting a main body of the nut in which an unthreaded hole having a diameter equal to or smaller than the pitch diameter of the male screw is formed at the center in the direction in which the male screw is driven, wherein the end face of the nut portion closer to the material to be secured is formed with a through hole connected to the unthreaded hole and having a diameter equal to or larger than the diameter of the unthreaded hole and a bushing portion having an outside diameter smaller than a hole in the material is continuously formed on the end face of the nut portion closer to the material to be secured. In the self-locking plastic nut for eye glasses, the unthreaded hole has a plurality of vertical grooves which are formed in its internal surface and which extend along the axis of the hole; and the main body of the nut is further formed with a rod-like arm portion which is formed integrally with the main body of the nut so as to protrude from the outer surface of the main body of the nut. This is why, according to the present invention, the self-locking nut for eye glasses is provided with the bushing portion which can be fit in a hole in the material to be secured and which is connected to the threaded hole in the first member. Consequently, the bushing portion serves as a T-washer so that it acts to protect the internal surface of the hole in the material to be fastened, while preventing the lateral horizontal vibration of the male screw, thereby further enhancing the self-locking effect.

The above fourth object can be attained by a selflocking nut for eye glasses wherein the second member further has: a cushioning portion which is attached to the end face of the metal nut closer to the material to be fastened and which is formed with a through hole concentric with the metal nut and having a diameter substantially equal to the root diameter of the metal nut; and a flange-like sealing portion in the shape of a truncated cone which extends continuously from the plastic layer covering the side face of the metal nut and which expands toward the material to be fastened, the sealing portion being brought into contact with the surface of the material to be fastened when the material to be fastened is fastened by the tightening of the male screw, while one end of the self-locking hole is closed or by a self-locking nut for eye glasses, wherein the second member still further has: a cushioning portion which is attached to the end face of the metal nut closer to the material to be fastened and which is formed with a through hole concentric with the metal nut and having a diameter substantially equal to the root diameter of the metal nut; and a flange-like sealing portion in the shape of a truncated cone which extends continuously from the plastic layer covering the side face of the metal nut and which expands toward the material to be fastened, the sealing portion being brought into contact with the surface of the material to be fastened when the material to be fastened is fastened by the tightening of the male screw, while one end of the self-locking hole is closed. This is why, according to the self-locking sealed nut of the present invention, a cushioning portion is provided between the material to be fastened and the main body of the metal nut, and a sealing portion is further provided on the end face of the nut closer to the material to be fastened so as to be in contact with the surface of the material to be fastened. On the other hand, the other end face of the nut away from the sealing portion is closed, while the side face of the metal nut is covered with the plastic material, so that the inside of the sealed nut is brought in the state of complete airtightness when the nut is fastened to the material to be fastened. Consequently, moisture is not allowed to enter from the outside, so that the main body of the metal nut inside is free from corrosion.

The above fifth object is attained by a self-locking nut for eye glasses, wherein the second member further has a rod-like arm portion which is formed integrally with a main body made of a plastic material so that its joint with the main body is formed thinner than the other portion thereof, the rod-like arm portion protruding from the outer surface of the main body. The above fifth object can also be attained by a self-locking plastic nut for eye glasses wherein the main body of the nut is further formed with a rod-like arm portion which protrudes from the outer surface of the main body of the nut so that its joint with the main body of the nut is formed thinner than the other portion thereof. The above fifth object can also be attained by a self-locking plastic nut for eye glasses which is composed of a resin and into which a male screw is fitted so as to secure a material between the head of the male screw and the self-locking plastic nut itself, the self-locking plastic nut comprising: a nut portion formed to have a polygonal cross section; and a nut extension formed continuously from the nut portion so as to have a diameter equal to or smaller than the outside diameter of the nut portion, the nut portion and nut extension constituting a main body of the nut in which an unthreaded hole having a diameter equal to or smaller than the pitch diameter of the male screw is formed at the center in the direction in which the male screw is driven, wherein the end face of the nut portion closer to the material to be secured is formed with a through hole connected to the unthreaded hole and having a diameter equal to or larger than the diameter of the unthreaded hole and a bushing portion having an outside diameter smaller than a hole in the material to be secured is continuously formed on the end face of the nut portion closer to the material. In the self-locking plastic nut for eye glasses, the main body of the nut is further formed with a rod-like arm portion which is formed integrally with the main body of the nut so as to protrude from the outer surface of the main body of the nut. This is why, to the self-locking nut of the present invention, the rod-like arm is integrally formed with the main body of the nut so that it protrudes from the outer surface of the main body of the nut and that its joint with the main portion of the nut is thinner than the other portion thereof. By holding the rod-like arm, the nut can be guided to the hole in the material to be fastened, and after the main body of the nut is set in the hole, the rod-like arm can be broken off. Consequently, the setting of the nut can be performed precisely and easily.

The above sixth object can be attained by a screwing ring for tightening a self-locking nut for eye glasses, the screwing ring comprising: a ring-shaped main body which can be put on a finger; and one or more bits which are fixed to the outer surface of the main body and which are formed into a shape whereby the self-locking nut can be rotated. In the screwing ring, one or more bits are selected from the group consisting of a box bit, a slot bit, and a cross-slot bit; and the outer surface of the main body is provided with an interchangeable bit. The above sixth object can also be attained by a nut tightener made of a plastic material for tightening a self-locking nut for eye glasses, the nut tightener comprising: a socket portion having a rectangular hole in its tip; a shank extending from the socket portion and having its outer surface composed of an uneven face; and a head provided on the rear end of the shank. This is why, according to the screwing ring of the present invention, the bits for screwing are attached to the ring so that the screwing operation can be performed by the worker wearing the screwing ring on his or her finger so as to hold it stably. Since the screwing ring of the present invention is made of a plastic material, there is no possibility of damaging the lens and the nut tightening ring becomes light in weight, so that its carryability is improved.

The above seventh object is attained by a nut supplier having a plurality of self-locking nuts for eye glasses, the nut supplier comprising: a connecting member which is radially branched to form a plurality of arm portions, the tips of the arm portions being tapered; and a plurality of self-locking nuts positioned on the individual tips of the radial arm portions of the connecting member, wherein the connecting member is formed, using a plastic material, integrally with the plurality of self-locking nuts positioned on the tips of its radial arm portions. This is why, according to the nut supplier of the present invention, self-locking nuts for eye glasses, which are too small to handle easily with fingers, are held on the tips of the radial arm portions of the connecting member which have their neck portions thinner than the other portions thereof. Consequently, the nuts can be guided to their respective intended positions with ease and precision in the operation of manufacturing eye glasses using the self-locking nut. After setting the nuts, they can easily be broken off the connecting member. Moreover, since the nut supplier holds a plurality of self-locking nuts, the nuts can be set one after another, resulting in an increase in nut fastening efficiency.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE EMBODIMENTS

Below, the present invention will be described in accordance with its embodiments.

(Embodiment 1)

Figure 1:
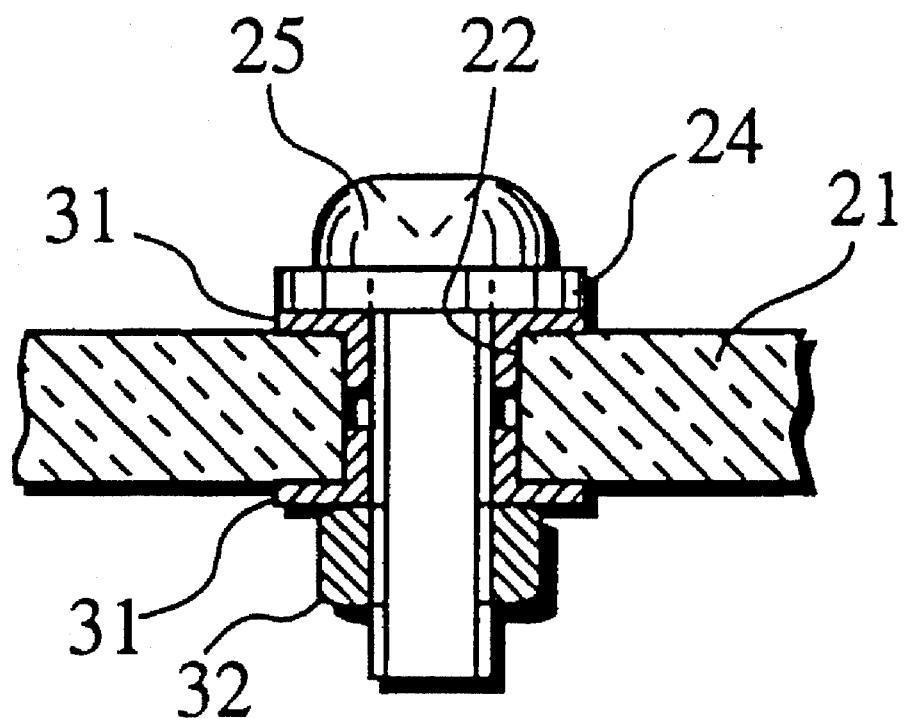
FIG. 1 is a view illustrating the state of fastening using a conventional nut for eye glasses.
Figure 2A:
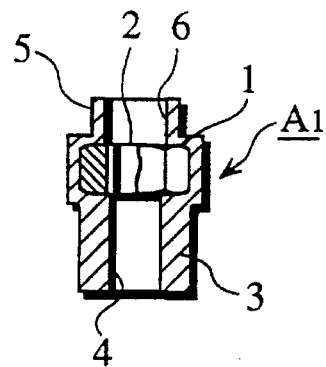
FIG. 2A is a sectional front view of a self-locking nut $A_1$ according to the present invention.
Figure 2B:
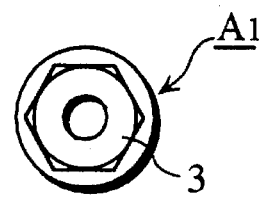
FIG. 2B is a bottom view of the self-locking nut $A_1$ according to the present invention.

FIG. 2A is a cross section of a self-locking nut $A_1$ according to the present invention, in which a reference numeral 1 designates a metal hexagon nut. In the center of the metal nut 1 was preliminarily formed a specified female thread 2. On the rear end of the metal nut 1 is integrally formed a plastic member 3 of hexagonal cross section (FIG. 2B), so as to extensively cover the side face of the metal nut 1. In the center of the plastic member 3 is formed an unthreaded hole 4, which is concentric with the metal nut 1. The diameter of the unthreaded hole 4 is equal to (or slightly smaller than) the pitch diameter of the female thread 2. On the front end of the metal nut 1 is formed a bushing portion 5 concentrically with the metal nut 1, which extends continuously from the plastic member 3. The inside diameter 6 of the bushing portion 5 is made slightly larger than the root diameter of the female thread 2. The self-locking nut $A_1$ can easily be fabricated by so-called insert molding in which the previously produced metal nut 1 is set in a mold and then a plastic material is injected thereto.

Figure 2C:
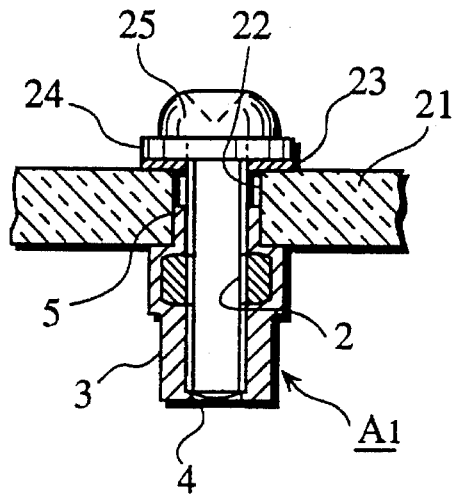
FIG. 2C is a view illustrating the state of fastening using the self-locking nut $A_1$ according to the present invention.

The self-locking nut $A_1$ thus constituted is optimum in, e.g., fastening a lens to rimless eye glasses. As shown in FIG. 2C, the bushing portion 5 of the self-locking nut $A_1$ is fitted into a hole 22 formed in a lens 21, so as to hold the plastic member 3 (the portion of hexagonal cross section) to the lens 21. A metal small screw 25, penetrating a flat washer 23 and a metal member 24 (e.g., a frame fitting), is screwed into the female thread 2 of the nut $A_1$. As the screwing proceeds, the tip of the small screw 25 reaches the unthreaded hole 4 of the plastic member 3 and the small screw 25 is further screwed therein, while forming threads. The plastic member 3 is composed of a polyacetal resin or a polyamide resin, which is softer than the material of the metal nut. Since the diameter of the unthreaded hole 4 was made substantially the same as the pitch diameter of the female thread 2, the small screw 25 can be screwed into the unthreaded hole 4 easily. Moreover, since the small screw 25 is pressed tightly by its surroundings due to the elasticity of the plastic member 3, the loosening of the screw can be prevented. Instead of the small screw 25, it is also possible to use a tapping screw. In the case of using the tapping screw, however, it is preferable to make the diameter of the unthreaded hole 4 slightly smaller than the pitch diameter of the tapping screw.

Figure 2D:
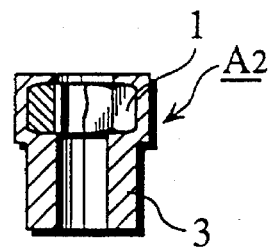
FIG. 2D is a sectional front view of a self-locking nut $A_2$ according to the present invention.
Figure 2E:
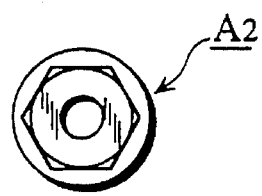
FIG. 2E is a bottom view of the self-locking nut $A_2$ according to the present invention.
Figure 2F:
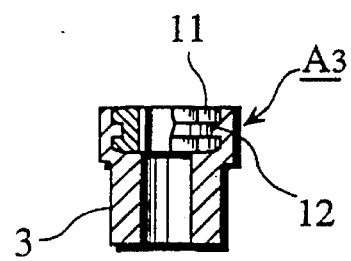
FIG. 2F is a sectional front view of a self-locking nut $A_3$ according to the present invention.
Figure 2G:
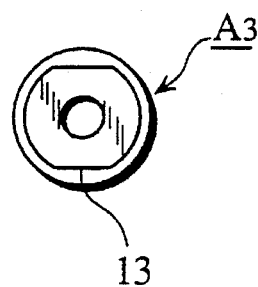
FIG. 2G is a bottom view of the self-locking nut $A_3$ according to the present invention.
Figure 2H:
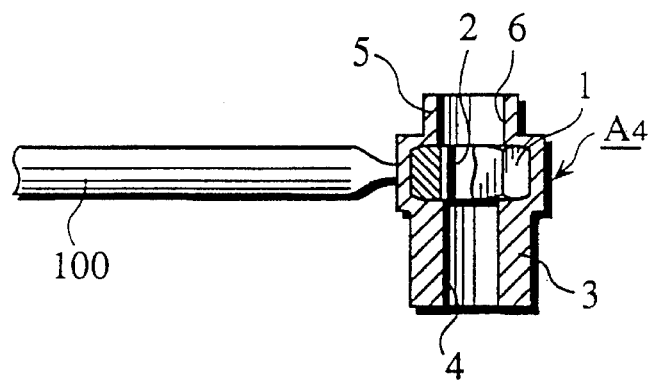
FIG. 2H is a sectional front view of a self-locking nut $A_4$ according to the present invention.
Figure 2I:
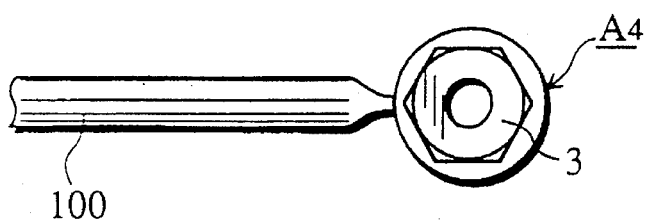
FIG. 2I is a bottom view of the self-locking nut $A_4$ according to the present invention.
Figure 2J:
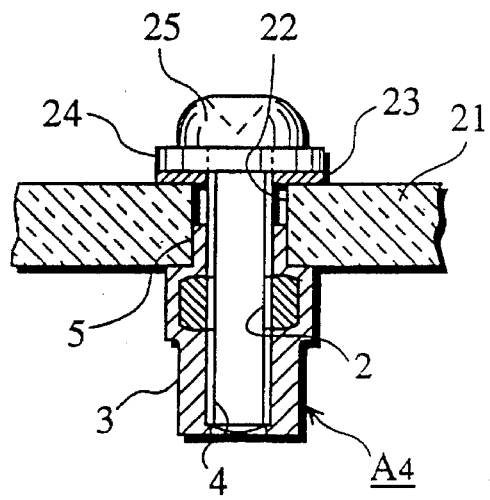
FIG. 2J is a view illustrating the state of fastening using the self-locking nut $A_4$ according to the present invention.

Next, variations of the present embodiment will be illustrated in FIGS. 2D to 2G and in FIGS. 2H to 2J.

A self-locking nut $A_2$ shown in FIGS. 2D and 2E is of a configuration which is obtained by removing the bushing portion 5 out of the above self-locking nut $A_1$. As for the other parts of the constitution, they are the same as those of the self-locking nut $A_1$. Accordingly, the self-locking nut $A_2$ is used in the case where the bushing portion 5 is not required. However, its screwing and self-locking effects are equal to those of the above self-locking nut $A_1$.

Another variation illustrated in FIGS. 2F and 2G is a self-locking nut $A_3$, in which the side face of the metal nut 11 is circumferentially formed with a groove 12 for fixation. The screwing and self-locking effects of the self-locking nut $A_3$ are equal to those of the above self-locking nut $A_1$ and self-locking nut $A_2$. In these variations, the cross section of the plastic member 3 may be a circle having two segments cut away 13 shown in FIG. 2G or other polygon, provided that it can engage with a tool in time of tightening.

Still another variation illustrated in FIG. 2H is a self-locking nut $A_4$ with an arm, which is obtained by adding a rod-like arm portion to the main body of the above self-locking nut $A_1$. The self-locking nut $A_4$ provided with the rod-like arm portion 100 can also be fabricated easily using the same plastic material and in the same method as those of the above self-locking nuts $A_1$ to $A_3$. However, the joint of the rod-like arm portion 100 with the main body of the nut is preferably formed thinner than the other portion thereof, so that the rod-like arm portion can be removed easily after the nut was set to the material to be fastened.

Since the self-locking nuts $A_1$ to $A_4$ described above have used metal nuts, sufficient tightening strength in the axial direction is obtained. Moreover, since the diameter of the unthreaded hole in the plastic member is made smaller than the major diameter of the screw, threads are formed by the small screw (or the tapping screw) in time of tightening, so that loosening can be prevented by the pressing force exerted on the outer surface of the screw due to the elasticity of the plastic material. Furthermore, since the bushing portion integrally formed renders a conventional T-washer unnecessary, improved assembling efficiency and lower cost can be realized, while a damage to the lens is prevented. If the plastic member is formed to have the same hexagonal cross section as that of the metal nut in terms of dimension, a large number of effects such as the continuing use of a conventional tool can be obtained.

In addition, since the self-locking nut $A_4$ has the arm portion 100 projecting from the main body of the nut, it is possible to guide the nut to an intended position in the material to be fastened by holding the arm portion 100. After setting the nut, the arm portion 100 can easily be broken off or in like manner (FIG. 2J), which further facilitates the operation of fastening the self-locking nut.

(Embodiment 2)

Figure 3A:
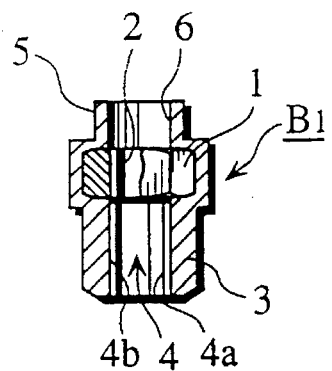
FIG. 3A is a sectional front view of a self-locking nut $B_1$ according to the present invention.
Figure 3B:
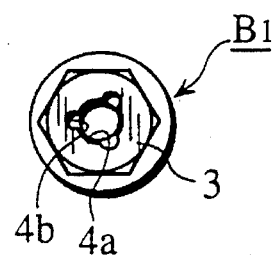
FIG. 3B is a bottom view of the self-locking nut $B_1$ according to the present invention.

FIGS. 3A and 3B show a self-locking nut $B_1$ of the present invention. In the drawings, the description of the same components as used in the above first embodiment will be omitted here by providing the same reference numerals (the same shall apply hereinafter). In the self-locking nut $B_1$, the unthreaded hole 4 consisting of a hole portion 4a and three vertically grooves 4b formed in the internal surface of the hole portion 4a is formed 1 in the center of the plastic member 3, so as to be concentric with the above metal nut 1. The diameter of the hole portion 4a is made equal to or slightly smaller than the pitch diameter of the female thread 2. On the front end of the metal nut 1 is formed the bushing portion 5 concentrically with the metal nut 1, which extends continuously from the above plastic member 3. The inside diameter 6 of the bushing portion 5 is made slightly larger than the root diameter of the female thread 2 of the metal nut 1. The self-locking nut $B_1$ can be fabricated by so-called insert molding in which the previously produced metal nut 1 is set in the mold and then a plastic material is injected thereto. In this case, a pressing member for aligning the nut is temporarily positioned in the vertical grooves 4b so as to carry out the insert molding with high precision and then the pressing member can be removed, thereby facilitating the fabrication of the self-locking nut.

Figure 3C:
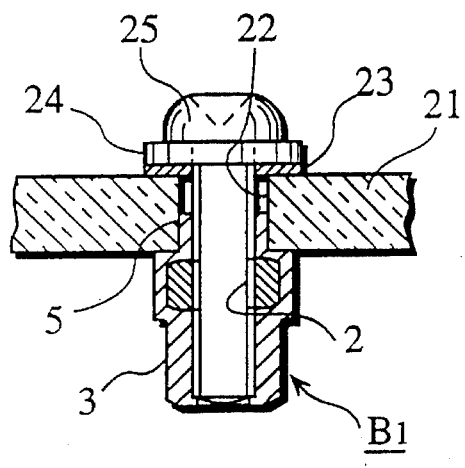
FIG. 3C is a view illustrating the state of fastening using the self-locking nut $B_1$ according to the present invention.

The self-locking nut $B_1$ thus constituted is optimum, e.g., in fastening a lens to rimless eye glasses. As shown in FIG. 3C, the bushing portion 5 of the self-locking nut $B_1$ is fitted into the hole 22 in the lens 21 so as to hold the plastic member 3 (of the hexagonal cross section) to The metal small screw 25, penetrating the flat washer 23 and metal member 24 (e.g., a frame fitting), is screwed into the female thread 2 of the nut $B_1$. As the screwing proceeds, the tip of the small screw 25 reaches the unthreaded hole 4 in the plastic member 3. The small screw 25 is further screwed into the unthreaded hole 4, while forming threads. The plastic member 3 can be composed of a polyacetal resin or a polyamide resin. Since the diameter of the unthreaded hole 4 is substantially the same as the pitch diameter of the female thread 2, the small screw 25 can be screwed into the unthreaded hole 4 easily. Moreover, since the small screw 25 is pressed tightly by its surroundings due to the elasticity of the plastic member 3, the loosening of the screw can be prevented. Furthermore, since the unthreaded hole 4 is formed with the vertical grooves, the male screw can be driven into the unthreaded hole 4 even if the diameter of the unthreaded hole 4 is made greatly smaller than the pitch diameter of the male screw. In this case, a particularly great self-locking effect can be obtained, while the male screw can be driven easily. Instead of the small screw 25, it is also possible to use a tapping screw. In the case of using the tapping screw, it is preferable that the diameter of the unthreaded hole 4 is made slightly smaller than the pitch diameter of the tapping screw.

Next, variations of the present embodiment will be illustrated in FIGS. 3D to 3G.

Figure 3D:
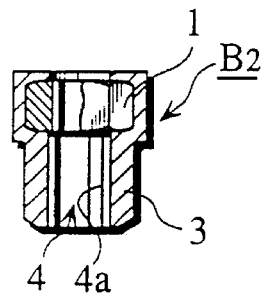
FIG. 3D is a sectional front view of a self-locking nut $B_2$ according to the present invention.
Figure 3E:
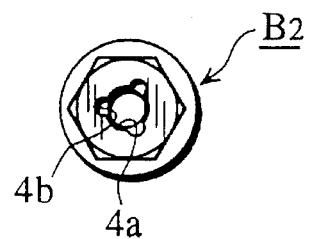
FIG. 3E is a bottom view of the self-locking nut $B_2$ according to the present invention.

A self-locking nut $B_2$ shown in FIGS. 3D and 3E is of a configuration which is obtained by removing the bushing portion 5 of the above self-locking nut $B_1$. As for the other parts of the configuration, they are the same as those of the self-locking nut $B_1$. Accordingly, the self-locking nut $B_2$ is used in the case where the bushing portion 5 is not required. However, its screwing and self-locking effects are equal to those of the above self-locking nut $A_1$.

Figure 3F:
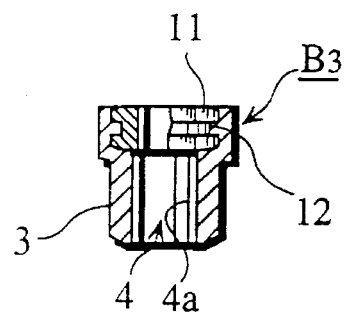
FIG. 3F is a sectional front view of a self-locking nut $B_3$ according to the present invention.
Figure 3G:
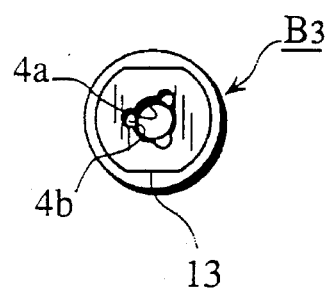
FIG. 3G is a bottom view of the self-locking nut $B_3$ according to the present invention.

Another variation illustrated in FIGS. 3F and 3G is a self-locking nut $B_3$, in which the side face of the metal nut 11 is circumferentially formed with the groove 12 for fixture. The screwing and self-locking effects of the self-locking nut $B_3$ are equal to those of the above self-locking nut $B_1$ and self-locking nut $B_2$. In addition to these variations, it is also possible to provide the main body of the nut with a rod-like arm portion, similarly to the above first embodiment. The cross section of the plastic member 3 may be a circle having two segments cut away 13 shown in FIG. 3G or other polygon, provided that it can easily engage with a tool at the time of tightening.

With the self-locking nuts $B_1$ to $B_3$ described above, not only the same effects as obtained with the self-locking nuts $A_1$ to $A_3$ of the above first embodiment can be obtained, but also the self-locking nuts $B_1$ to $B_3$ can be molded in the fabrication process by providing the nut pressing member in the vertical grooves so that the metal nut is horizontally aligned in a specified position. Consequently, the self-locking nut with high quality can be fabricated at low cost.

(Embodiment 3)

Figure 4A:
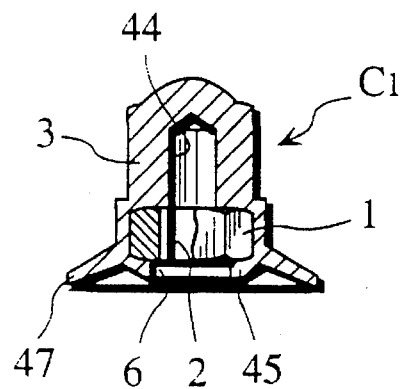
FIG. 4A is a Sectional front view of the self-locking sealed nut $C_1$ according to the present invention.
Figure 4B:
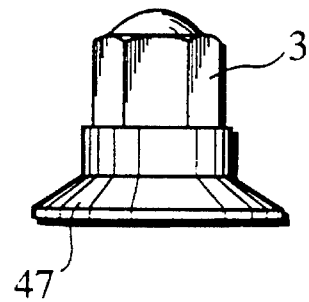
FIG. 4B is an external front view of a self-locking sealed nut $C_1$ according to the present invention.
Figure 4C:
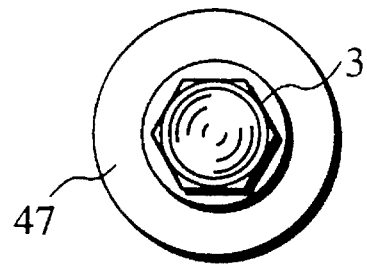
FIG. 4C is a plan view of the self-locking sealed nut $C_1$ according to the present invention.

FIGS. 4A to 4C show a self-locking sealed nut $C_1$ of the present invention. In the drawings, a reference numeral 1 designates a metal hexagon nut. In the center of the hexagon nut is formed the specified female thread 2. On the rear end of the metal nut 1 is integrally formed the plastic member 3 of hexagonal cross section, so as to extensively cover the side face of the metal nut 1. In the center of the plastic member 3 is formed an unthreaded hole, concentrically with the metal nut 1, so that its diameter is substantially the same as the minor diameter of the female thread 2 (diameter of the crest of the female thread). One end of the unthreaded hole is closed so that an unthreaded cap hole 44 can be formed. On the other hand, on the front end of the metal nut 1 is formed an annular projection 45 concentrically with the metal nut 1, which extends continuously from the plastic member 3. The inside diameter 6 of the annular projection 45 is made slightly larger than the root diameter of the female thread 2. The plastic member is also provided with a flange-like sealing portion 47 which expands from the metal nut 1 toward the edge. The circular edge of the sealing portion 47 is formed slightly outside the annular projection 45. The self-locking sealed nut $C_1$ can easily be fabricated by so-called insert molding in which the previously produced metal nut 1 is set in the mold and then a plastic material is injected thereto.

Figure 4D:
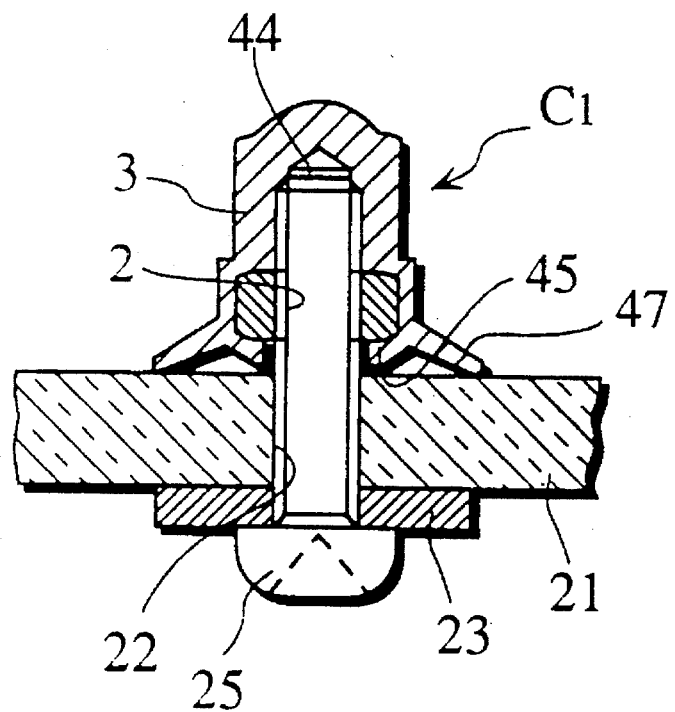
FIG. 4D is a view illustrating the state of fastening using the sealed nut $C_1$ according to the present invention.

The self-locking sealed nut $C_1$ thus constituted is optimum for use in a place where the atmosphere is corrosive and eye glasses are exposed to rain. As shown in FIG. 4D, the self-locking sealed nut $C_1$ is applied onto the surface of the lens 21 (the material to be fastened), while keeping the cross section of the plastic member 3 in the original shape (hexagon). On the other hand, the hole 22 in the lens 21 is aligned with respect to the flat washer 23, so that the metal small screw 25 is inserted. The small screw 25 is screwed into the female thread 2 of the metal nut 1. As the screwing proceeds, the tip of the small screw 25 penetrates the metal nut 1 and reaches the unthreaded cap hole 44 in the plastic member 3. From this point, the small screw 25 is driven into the unthreaded cap hole 44, while forming threads. The plastic member 3 is composed of a polyacetal resin or a polyamide resin. Since the diameter of the unthreaded cap hole 44 was made substantially equal to the minor diameter of the female thread 2, it can easily be screwed into the unthreaded cap hole 44. As the screwing proceeds, the sealing portion 47 of the self-locking sealed nut $C_1$ is pressed onto the lens 21, and if the screw 25 is further driven, the annular projection 45 reaches the lens 21, thereby completing the tightening. In this manner, the flange-like sealing portion 47 is brought into contact with the member to be fastened, so as to exert a sealing function. On the other hand, the threads formed in the tip of the small screw 25, which has been screwed into the unthreaded cap hole 44, are pressed tightly by their surroundings due to the elasticity of the plastic member 3 so that the loosening of the screw can be prevented. Instead of the small screw 25, it is also possible to use a tapping screw.

Figure 4E:
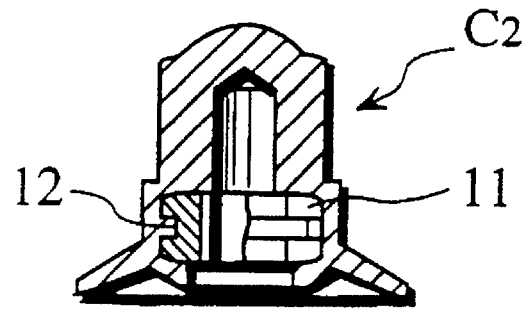
FIG. 4E is a sectional front view of a self-locking sealed nut $C_2$ according to the present invention.

A variation of the present embodiment illustrated in FIG. 4E is a self-locking sealed nut $C_2$, which is obtained by providing the side face of the metal nut 11 with a circumferential groove so that its fixation to the plastic member can be improved. The sealing function and self-locking effect of the self-locking sealed nut $C_2$ are equal to those of the above self-locking sealed nut $C_1$.

In these variations, although the cross sections of the plastic member 3 and of the metal nut 1 are hexagons, they can be circles having their two segments cut away or other polygons. It is also possible to add rod-like arms to the main bodies of the above sealed nuts $C_1$ and $C_2$, similarly to the first embodiment.

With the above sealed nuts $C_1$ and $C_2$, sufficient tightening strength in the axial direction is provided by the metal nut. Moreover, since the diameter of the unthreaded cap hole 44 of the plastic member is made substantially the same as the minor diameter of the female thread, the small screw (or the tapping screw) forms threads as it is screwed in. The loosening of the screw is prevented by the pressing force exerted onto the outer surface of the screw due to the elasticity of the plastic member, and the fastening device can completely be sealed by the sealing portion 47. Consequently, even if eye glasses are exposed to rain, the entry of water into the fastening device can be prevented. Furthermore, since the entry of air is also prevented, the metal nut is free from corrosion. As a result, the excellent appearance of eye glasses can be maintained for a long period of time. In addition, since the sealed nuts $C_1$ and $C_2$ are excellent in assembling efficiency, they contribute to the realization of lower-cost eye glasses.

(Embodiment 4)

Figure 5A:
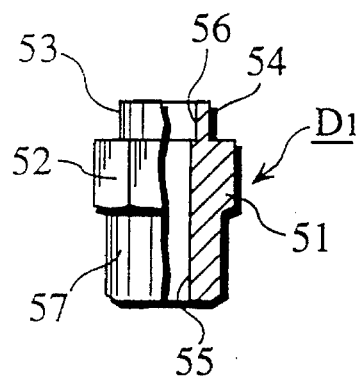
FIG. 5A is a partial sectional front view of a plastic nut $D_1$ according to the present invention.
Figure 5B:
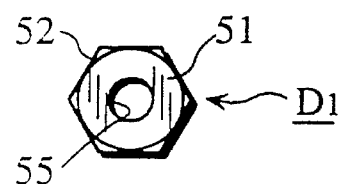
FIG. 5B is an external front view of the plastic nut $D_1$ according to the present invention.

In FIGS. 5A and 5B is shown a plastic nut $D_1$ consisting of: a nut portion 51 which is hexagonal in cross section and which has an engaging portion 52 for engagement with a tool; and a bushing portion 54 which extends concentrically with the nut portion 51 from a pressing face 53 thereof. The nut portion 51 and bushing portion 54 are formed integrally from a plastic material (a polyacetal resin, a polyamide resin, or like resin). An unthreaded hole 55 is formed through the center of the nut portion 51. The diameter of the unthreaded hole 55 is made equal to (or slightly smaller than) the pitch diameter of a small screw or tapping screw serving as a mating screw. On the other hand, the inside diameter of the bushing portion 54 is made slightly larger than the major diameter of the screw to be used, while the outside diameter of the bushing portion 54 is made smaller than the outside diameter of the nut portion 51, so that the pressing face 53 can be formed. Although the cross section of the engaging portion 52 is a hexagon in the present embodiment, it can be a circle having its two segments cut away or other polygon, provided that it can engage with a tool. The plastic nut $D_1$ can be fabricated at low cost by injection molding using various plastic materials.

Figure 5C:
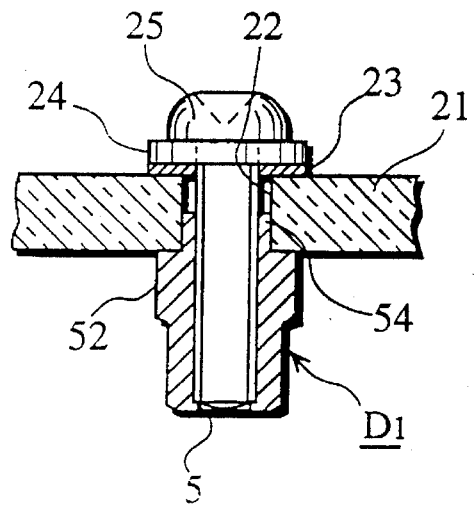
FIG. 5C is a view illustrating the state of fastening by the plastic nut $D_1$ according to the present invention.

The plastic nut Dthus constituted is appropriate in fastening a lens to rimless eye glasses. As shown in FIG. 5C, the bushing portion 54 of the plastic nut $D_1$ is fitted into the hole 22 in the lens 21 so as to keep the engaging portion 52 (hexagonal in cross section) to it. The metal small screw 25 (or a tapping screw), penetrating the flat washer 23 and metal member 24 (e.g., a frame fitting), is then fitted into a hole 56 of the bushing portion 54. If the screwing of the small screw 25 is initiated from this point, the small screw 25 reaches the unthreaded hole 55 and is further driven therein, while forming threads. Since the plastic material used here is a polyacetal resin, a polyamide resin, or like resin and the diameter of the unthreaded hole 55 is made substantially equal to the pitch diameter of the screw 25, it can easily be screwed into the unthreaded hole 55. Moreover, since the small screw 25 is pressed tightly by its surroundings due to the elasticity of the plastic material, the loosening of the screw can be prevented. Instead of the small screw 25, it is also possible to use a tapping screw. In the case of using the tapping screw, it is preferable that the diameter of the unthreaded hole 55 is made slightly smaller than the pitch diameter of the tapping screw.

Figure 5D:
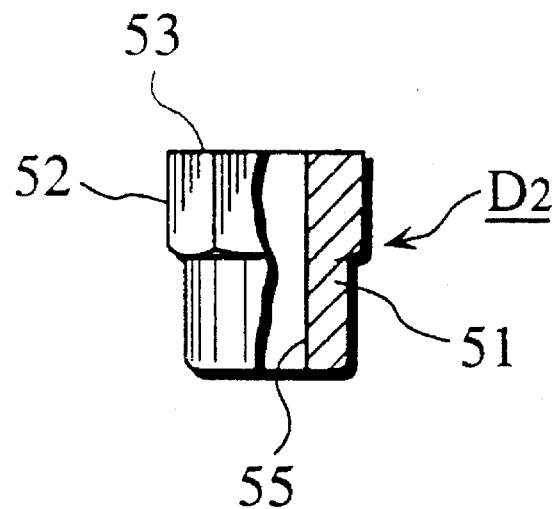
FIG. 5D is a partial sectional front view of a plastic nut $D_2$ according to the present invention.
Figure 5E:
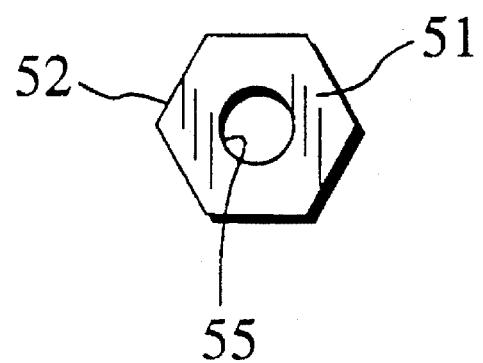
FIG. 5E is a bottom view of the plastic nut $D_2$ according to the present invention.

Next, a variation of the present embodiment is illustrated in FIGS. 5D and 5E. A plastic nut $D_2$ shown in FIGS. 5D and 5E is of a configuration obtainable by removing the bushing portion 54 out of the plastic nut $D_1$ described above. As for the other parts of the structure, they are the same as those of the plastic nut $D_1$. Accordingly, the plastic nut $D_2$ is used in the case where the bushing portion 54 is not required, and its screwing and self-locking effects are the same as those of the plastic nut $D_1$. It is also possible to add a rod-like arm portion to the main body of each of the plastic nuts $D_1$ and $D_2$. Since the plastic nuts $D_1$ and $D_2$ are completely composed of a plastic material, they can easily be formed integrally with their arm portions.

In the plastic nuts $D_1$ and $D_2$, since the diameter of the unthreaded hole is made smaller than the major diameter of the screw, threads are formed by the small screw (or the tapping screw) as the screw is tightened. Consequently, the loosening of the screw can be prevented by the pressing force exerted on the outer surface of the screw due to the elasticity of the plastic material. Moreover, since the conventional T-washer becomes unnecessary due to the provision of the bushing portion, assembling efficiency is increased, resulting in lower assembling cost. Furthermore, since the plastic nuts $D_1$ and $D_2$ are completely composed of a plastic material, they are light in weight. Consequently, even if the plastic nuts $D_1$ and $D_2$ are dropped onto the lens, the lens is not damaged.

(Embodiment 5)

Figure 6A:
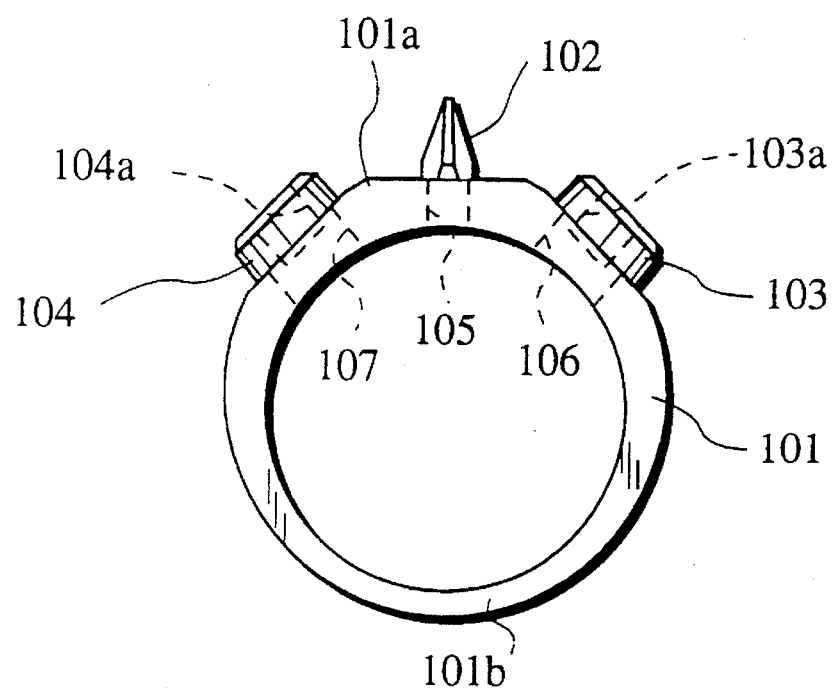
FIG. 6A is a front view of a screwing ring for eye glasses according to the present invention.
Figure 6B:
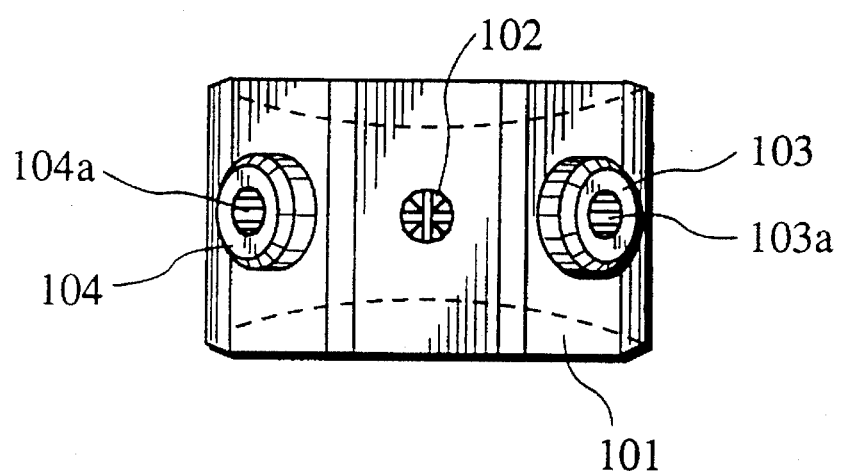
FIG. 6B is a plan view of the screwing ring for eye glasses.

FIGS. 6A and 6B show an embodiment of the screwing ring for eye glasses according to the present invention. In the drawings, reference numeral 101 designates the main body of the screwing ring which consists of a thick portion 101a and a thin portion 101b. The width of the thin portion 101b is made slightly smaller than that of the thick portion 101a. The inside diameter of the screwing ring is determined based on the finger size of a common worker so that he or she can wear it. To the outer surface of the thick portion 101a of the main body 101 is radially fixed a cross-recess bit 102, which is shaped so as to be engaged with the cross-recessed head of the screw. At a specified distance from and on both sides of the cross-recess bit 102 are located box bits 103 and 104, which are also radially fixed to the main body 1 of the screwing ring. The box bits 103 and 104 have holes for engagement 103a and 104a of different sizes, respectively, so that each hole can engage with a hexagon nut. Although the holes for engagement 103a and 104a in the box bits 103 and 104 are formed with twelve ridges and grooves in the present embodiment, they can be formed into hexagons. Although the present embodiment is provided with one cross-recess bit 102, one box bit 103, and one box bit 104, it can also be provided with a large number of other additional bits. Although each of the bits 102, 103, and 104 is fixed to the main body 101, it is also possible to constitute the screwing ring in such a manner that the bits 102, 103, and 104 are interchangeably inserted into the main body 101. In the case of using insertable bits, each of insertions 105, 106, and 107 is achieved by the combination of a rectangular hole and a rectangular projection, for example, so as to prevent rotation. It is also possible to tear off a part of the thin portion 101b of the main body 101, so that it can be used widely by different workers with different-sized fingers.

The screwing ring for eye glasses is optimum for use in the low-torque loosening and unfastening of a small screw and a small nut, which are used in a temple or bridge of eye glasses. Prior to the screwing operation, the worker puts on the screwing ring and holds its main body 1 on his or her finger. Then, the worker fits a small nut in its box bit (103 or 104) and applies it to an intended position under the work piece. Subsequently, a small screw is inserted from above the work piece, followed by the tightening using a driver for small screws, so that the small screw and nut are securely fastened to the work piece. In the case of loosening the screw, the above procedure is reversed. Alternatively, it is also possible to apply the cross-recess bit 2 to the screw head and tighten or loosen the small nut by means of a spanner for small nuts or the like, depending on the position in which the small screw and nut are to be fastened. Moreover, it is also possible to use two screwing rings of this type so that one ring serves as a holder, while the other ring serves as a tightener. Since the screwing ring is in the shape of a ring, it can be held stably on the finger of the worker, so that secure fastening can be performed even in a blind spot behind the work piece. In the screwing ring with interchangeable bits, if various bits are kept handy, screws and nuts of different types can be fastened easily by simply changing a bit to the required one.

In the screwing ring described above, since its main body is in the shape of a ring, it can be held easily so that screwing is stably performed with constant accuracy, resulting in improved working efficiency. In the screwing ring with interchangeable bits, if various screws and nuts are kept handy, different types of screws and nuts can be fastened easily by simply changing a bit to the required one. Moreover, if the main body 101 is constituted so that its thin portion is partly cut off, a large number of effects can be obtained, including the use of the screwing ring by different workers with different-sized fingers.

(Embodiment 6)

Figure 7A:
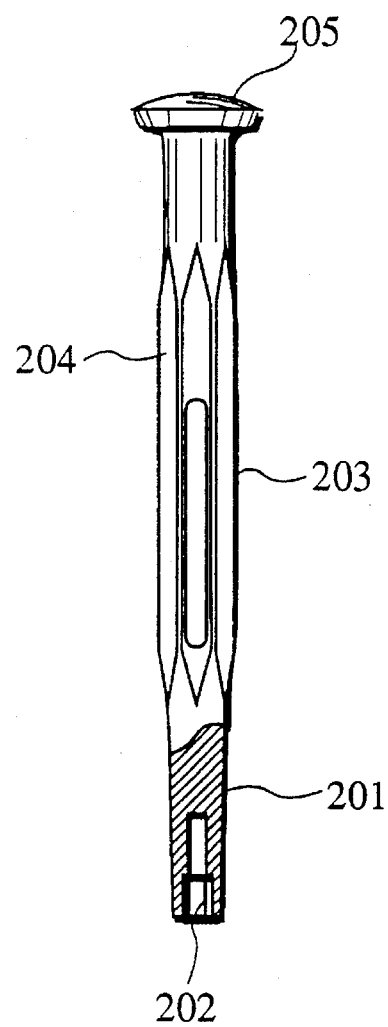
FIG. 7A is a partial sectional view of a nut tightener for eye glasses.
Figure 7B:
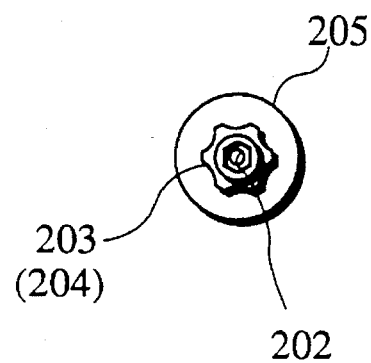
FIG. 7B is a bottom view of the nut tightener for eye glasses according to the present invention.

FIGS. 7A and 7B show an embodiment of the nut tightener of the present embodiment. In the drawings, reference numeral 201 designates a socket portion which is formed with a hexagonal hole 202 in the center of its tip. The hexagonal hole 202 is for engagement with a nut, and it can also be formed into other shapes such as a dodecagon, depending on the shape of a nut. From the socket portion 201 is continuously formed a shank 203, the outer surface of which is composed of an uneven face 204 provided with a large number of vertical grooves. The uneven face 204 is for preventing slip page when the nut tightener is rotated by fingers. Although the uneven face 204 is formed with a large number of vertical grooves in the present embodiment, it can also be formed with rhombic knurls or the like. The rear end of the shank 203 is formed with a head 205 for pressing the nut tightener. The head 205 can be rotatably formed in a separate part. By using a plastic material (e.g., a resin containing glass fibers), the socket portion 201, shank 203, and head 205 can be integrally formed (or they can be formed in separate parts). The foregoing shank 203 can also be formed with the manufacturer's name, size of the nut tightener, or the like.

The nut tightener is optimum for use in the low-torque tightening of a small nut when eye-glass lenses are to be fastened to a frame or the like. The user fits the small nut into the hexagonal hole 202 in the tip of the nut tightener and then picks up the shank 203 and the end face of the head 205 between his or her fingers. By rotating with fingers the uneven face 204 which has undergone nonslip processing, the small nut can be tightened or loosened. Since the nut tightener can be mass-produced at low cost using a plastic material, it is widely available to common eye-glass users and is excellent in carryability. Since the shank 203 is made of a plastic material, the nut tightener has an advantage -that the manufacturer's name and size of the nut tightener can be written thereon easily.

(Embodiment 7)

Figure 8A:
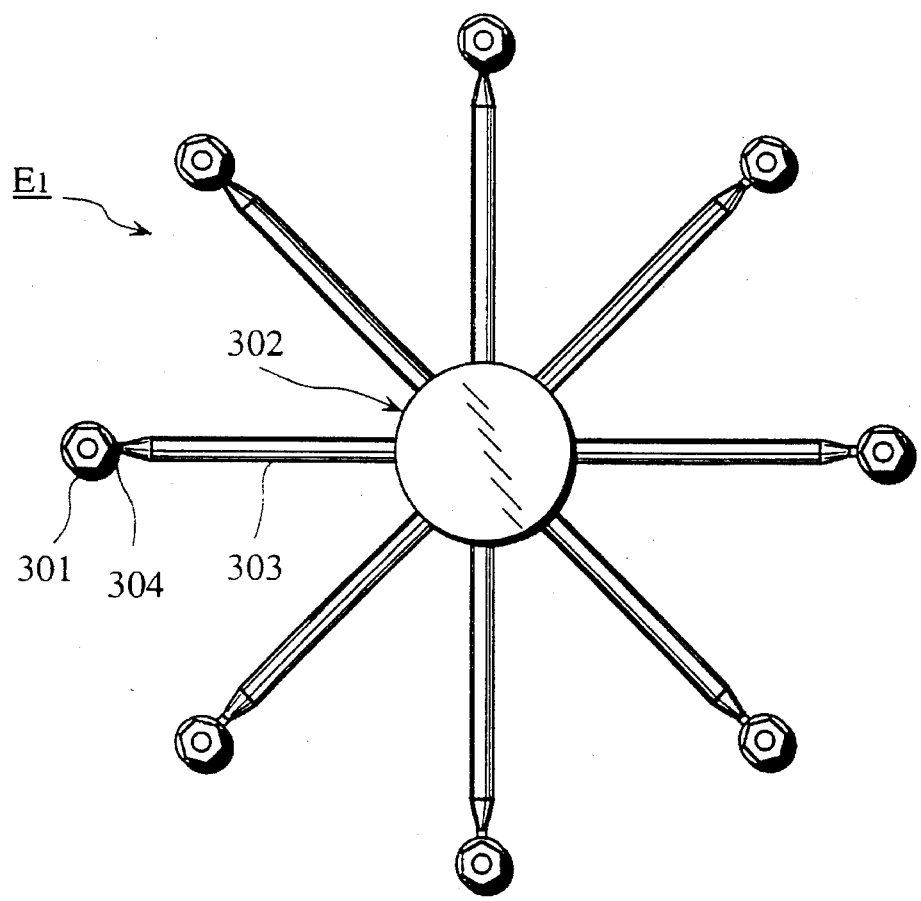
FIG. 8A is a plan view of a nut supplier $E_1$ according to the present invention.
Figure 8B:
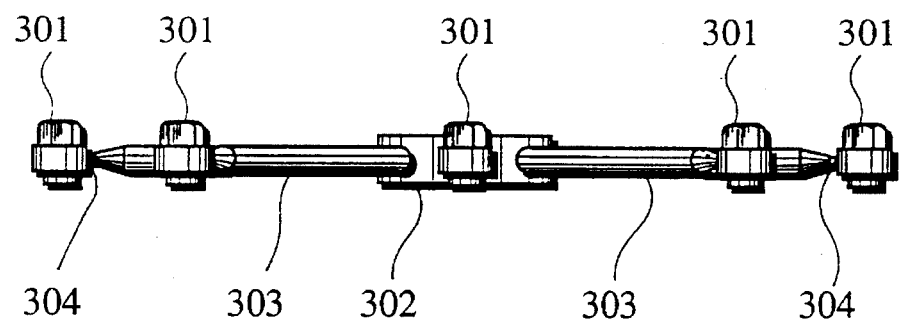
FIG. 8B is a front view of the nut supplier $E_1$ according to the present invention.
Figure 8C:
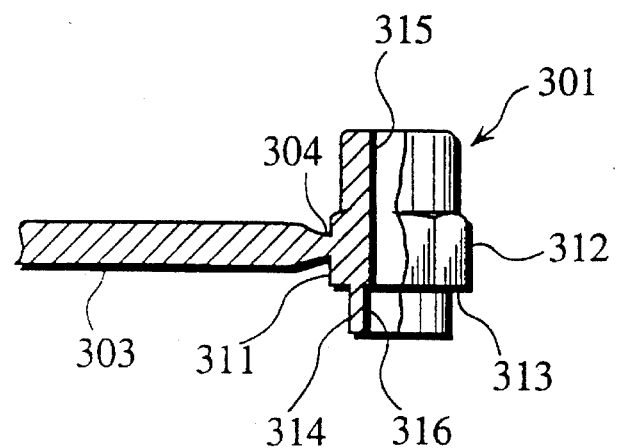
FIG. 8C is a partial sectional enlarged front view of the nut portion of the nut supplier $E_1$.

FIGS. 8A and 8B show a nut supplier $E_1$ of the present invention. In the drawings, a reference numeral 301 designates a small nut made of a resin (a polyacetal resin, a polyamide, or like resin), which is used in eye glasses. The small nuts 301 are connected to the ends of radial arm portions 303 extending from a connecting member 302 via thin necks 304, so that the small nuts are in the same upright position. The connecting member 302 and the small nuts 301 are integrally formed from the same plastic material. As detailed in FIG. 8C, the small nut 301 consists of a nut portion 311 and a bushing portion 314 extending concentrically from a pressing face 313 of the nut portion 311, which are formed in an integral part. Through the center of the nut portion 311 is formed an unthreaded hole 315. The diameter of the unthreaded hole 315 is made equal to or slightly smaller than the pitch diameter of a small screw (or a tapping screw) used as the mating screw, so that the mating metal screw can be driven into the hole 315 and pressed by its surroundings, while forming threads. The inside diameter 316 of the bushing portion 314 is made slightly larger than the major diameter of the small screw, while the outside diameter of the bushing portion 314 is made smaller than the outside diameter of the nut portion 311 so as to form the pressing face 313. The nut supplier $E_1$ thus constituted can easily be formed by radial molding using a plastic mold. That is, an opening for injection of the plastic mold is formed around the center of the connecting member 302. By using the plurality of radial arm portions 303 as runners of the mold and the thin necks 4 as gates of the mold, the portions corresponding to the small nuts 301 are provided on the tips of the radial arm portions 303 via the thin necks 304.

The nut supplier $E_1$ thus constituted is used as it is in the assembling operation without preliminarily cutting the small nuts 301 off the tips of the radial arm portions 303. In the nut supplier $E_1$, since the small nuts 301 in the same upright position are connected to the tips of the radial arm portions 303, the tightening of the small nuts 301 is initiated by applying the small nuts 301 which are in the upright position to an intended portion of the work while supporting the central portion of the connecting member 302 by hand, fitting the box bit of the driver into the hexagonal engagement portion of the nut 301, and then rotating the driver. At the same time, the small nut 301 is broken off the neck 304 so that only the small nut 301 can be fastened to the work. In this manner, the nuts 301 are quickly fastened to the work in succession.

Figure 8D:
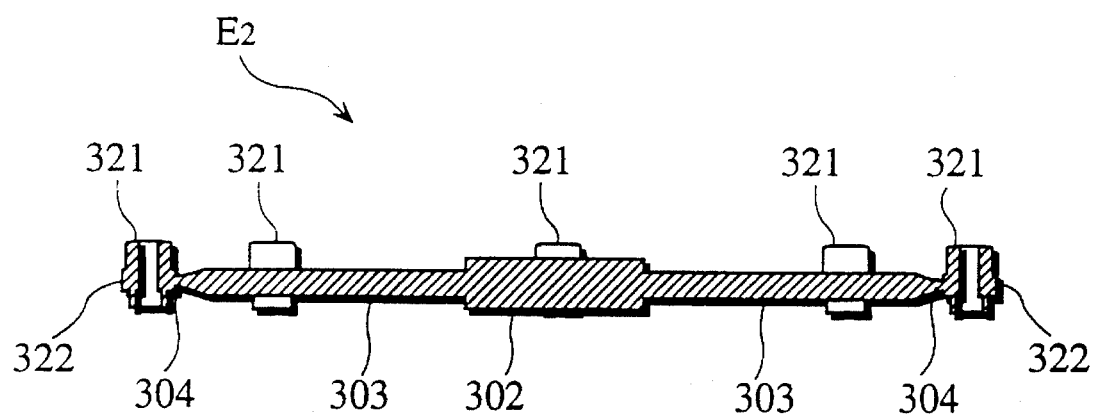
FIG. 8D is a sectional front view of another nut supplier $E_2$ according to the present invention.

FIG. 8D shows a variation of the present embodiment. In a nut supplier $E_2$, small nuts 321, in which metal nuts 322 formed with specified threads are fit, are connected to the tips of the radial arm portions 303 via the thin necks 304. The nut supplier $E_2$ can also be formed by injection molding of a plastic material in substantially the same manner as used in forming the nut supplier $E_1$, so that the operation of fastening the small nuts 321 can be performed similarly.

In the nut suppliers $E_1$ and $E_2$ described above, since the small nuts 1 in the same upright position are connected to the arm portions of the connecting member via the thin necks provided on their tips, the use of an aligning device is no more necessary. Moreover, the nut suppliers can be moved to the intended portion of the work by supporting the connecting member by hand and the hexagonal nut can be fitted into the box bit of the driver with ease, so that the speed at which the small nut is fastened is remarkably increased. Furthermore, since a large number of small nuts can be connected to the connecting member, the nuts are fastened to the work one after another at a high speed, so that unique effects such as a reduction in fastening cost can be obtained.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A self-locking nut for eye glasses into which a male screw is fitted so as to secure materials between the head of the male screw and the self-locking nut itself, comprising:

a first member having a female-thread portion formed with a female thread in which said male screw is screwed and a pressing end face for pressing the material to be secured when said male screw is screwed in;

a second member which is continuously formed on the other end face of said first member away from said material and which has a self-locking hole concentric with and connected to the hole of said female thread; and a third member continuously formed on the end face of said first member closer to said material and having a bushing portion which can be inserted into a hole in the material and which is formed with a through hole connected to the hole of the female thread of said first member.

2. A self-locking nut for eye glasses according to claim 1, wherein the self-locking hole of said second member is an unthreaded hole having a diameter equal to or slightly smaller than the pitch diameter of the female thread of said first member.

3. A self-locking nut for eye glasses according to claim 2, wherein said second and third members are composed of a plastic material softer than the material of the first member and are formed integrally with said first member so as to cover up the side face of said first member.

4. A self-locking nut for eye glasses according to claim 3, wherein the first member is a metal nut.

5. A self-locking nut for eye glasses according to claim 4, wherein the side face of said metal nut is formed with a groove for enhancing the fixation of the metal nut to the second member.

6. A self-locking nut for eye glasses according to claim 5, wherein said second member further has a rod-like arm portion which protrudes from the outer surface of a main body made of a plastic material so that its joint with said main body is formed thinner than the other portion thereof.

7. A self-locking nut for eye glasses according to claim 4, wherein said second member further has a rod-like arm portion which protrudes from the outer surface of a main body made of a plastic material so that its joint with said main body is formed thinner than the other portion thereof.

8. A self-locking nut for eye glasses according to claim 3, wherein said second member further has a rod-like arm portion which protrudes from the outer surface of a main body made of a plastic material so that its joint with said main body is formed thinner than the other portion thereof.

9. A self-locking nut according to claim 2, wherein said unthreaded hole has a plurality of vertical channels which are formed in its internal surface and which extend along the axis of said hole.

10. A self-locking nut for eye glasses according to claim 9, wherein the first member is a metal nut.

11. A self-locking nut for eye glasses according to claim 10, wherein the side face of said metal nut is formed with a groove for enhancing the fixation of the metal nut to the second member.

12. A self-locking nut for eye glasses according to claim 11, wherein said second member further has a rod-like arm portion which protrudes from the outer surface of a main body made of a plastic material so that its joint with said main body is formed thinner than the other portion thereof.

13. A self-locking nut for eye glasses according to claim 10, wherein said second member further has a rod-like arm portion which protrudes from the outer surface of a main body made of a plastic material so that its joint with said main body is formed thinner than the other portion thereof.

14. A nut supplier having a plurality of self-locking nuts for eye glasses, said nut supplier comprising:

a connecting member which is radially branched to form a plurality of arm portions, the tips of said arm portions being tapered; and a plurality of self-locking nuts positioned on the individual tips of the radial arm portions of said connecting member, wherein said connecting member is formed, using a plastic material, integrally with the plurality of self-locking nuts positioned on the tips of its radial arm portions.

* * * * *